Aug. 3, 1937.　　M. M. GUGGENHEIM　　2,088,740
AUTOMATIC MACHINE FOR FILLING MOLDS AND OTHER CONTAINERS
Filed Feb. 17, 1936
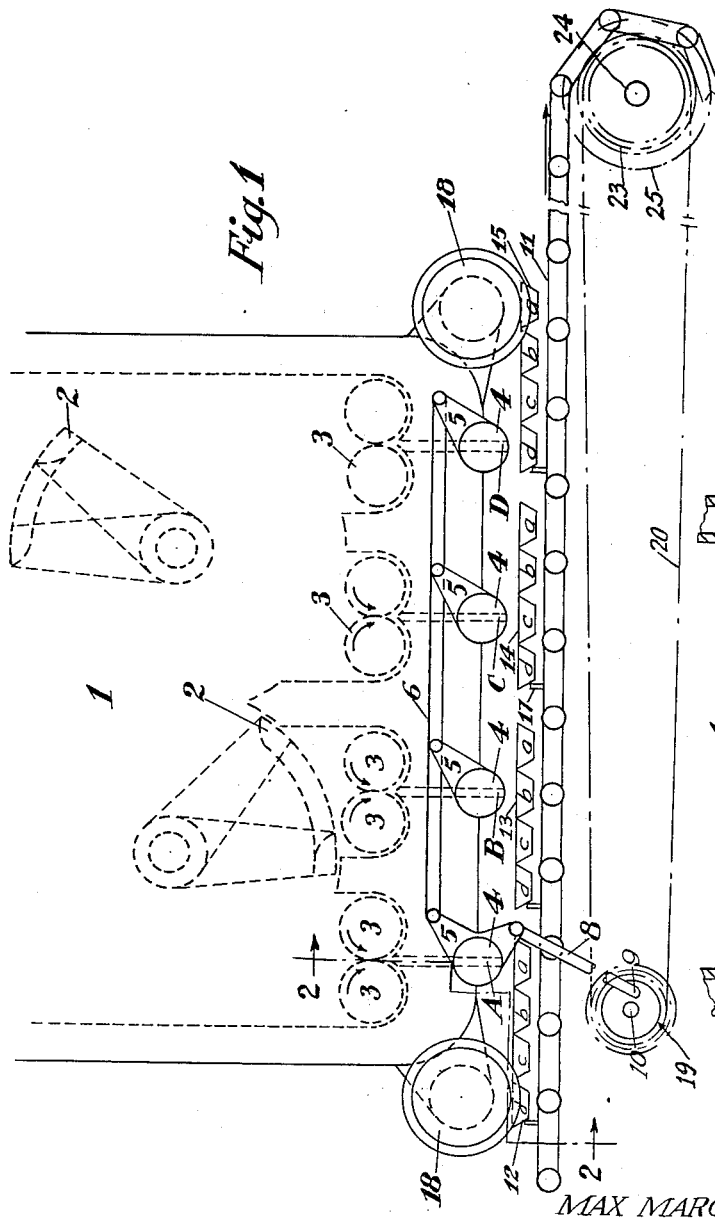
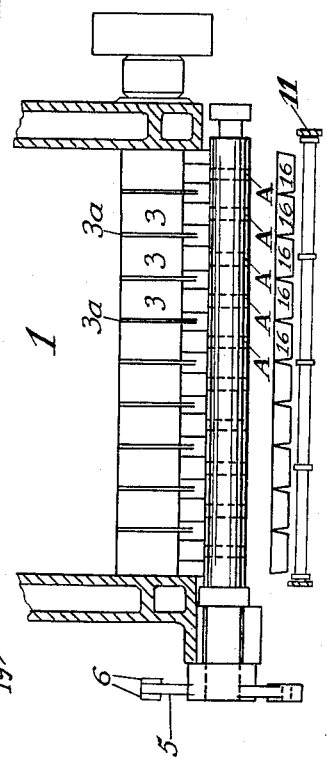
MAX MARC GUGGENHEIM
INVENTOR.
BY *George B. Willcox*
ATTORNEYS.

Patented Aug. 3, 1937

2,088,740

UNITED STATES PATENT OFFICE 2,088,740

AUTOMATIC MACHINE FOR FILLING MOLDS AND OTHER CONTAINERS

Max Marc Guggenheim, Saginaw, Mich., assignor to Baker Perkins Company, Inc., Saginaw, Mich., a corporation of New York Application February 17, 1936, Serial No. 64,365

2 Claims. (Cl. 107—8)

This invention relates to machines for filling automatically a plurality of containers with fluent material. It relates particularly to machines for depositing measured batches of molten confectionery, such as chocolate, into multiple molds for the making of candy bars; but in its broader aspects it is adapted to the filling of bottles or other containers with measured quantities of liquid, plastic, or dry material. It has for its object the provision of a depositing apparatus which, by a novel arrangement of known elements, has a capacity or a rate of output several times that of any plant of comparable size heretofore in use.

The purposes and advantages of the invention can be best understood by an understanding of the nature and operation, for instance, of the usual chocolate depositing or mold-filling plant.

The usual apparatus for the depositing of chocolate bars consists of a long endless mold conveyor, the greater part of which passes through a large cooling chamber where the molten chocolate solidifies in the molds. The feed-in end of this conveyor, which represents a minor part of its overall length, passes beneath a chocolate-depositing machine of known kind, in which a plurality of valve-controlled nozzles are arranged in a row transversely of the conveyor for filling in timed relation to the conveyor travel successive ranks of molds carried by the conveyor. The molds are assembled in rank and file in trays extending across the conveyor, presenting a file of molds for each depositing nozzle. The number of ranks of molds in each tray depends upon the length of the individual molds, being such as to provide a tray of a size convenient for handling.

The output of such a plant in terms of pieces or pounds per hour is limited by several mechanical factors. Thus the number of molds of a given size in each rank across the conveyor depends upon the width of the conveyor running through the cooling system. This width is dependent upon the considerations of conveyor construction, the stiffness of the trays to prevent warping or bending, and upon practical limits of width of the depositing machine.

Another factor is that a constant, even travel of the conveyor is necessary to avoid jolting of the trays and distortion of the congealing bars in the freshly filled molds.

Furthermore, this typical depositing machine, having a single transverse row of depositing nozzles, has a definitely limited output in terms of pieces per unit of time, determined by the maximum speed and frequency at which the valve mechanism can be operated. If it is desired to increase the rate of output of the plant, or if the frequency of deposit is to be increased without changing the output, as in producing smaller bars or pieces, very little increase in the output can be obtained by speeding the mechanism. Heretofore, therefore, to increase the output of the plant two, three, four, or more times it has been necessary to multiply the number of depositing nozzles and the number of associated conveyors and cooling chambers proportionately.

The object of my invention is to provide, in view of the above limitations, an improved mold-filling apparatus which will make possible in a plant of any given size such a multiplied output with little or no increase in the length of the single conveyor and in the size of the cooling plant.

The invention by which this object is attained consists in the provision of a plurality of valve-controlled depositing nozzles, or rows of such nozzles, arranged in a new relationship to the conveyor and its drive mechanism, and operable in timed relationship to the travel of the conveyor in a novel manner.

Further objects and features of the invention are described in the following specification.

Referring to the drawing, Fig. 1 is a diagrammatic side elevation of a section of a mold conveyor and a chocolate-depositing machine according to the invention.

Fig. 2 is a sectional end view of the machine, taken transversely of the conveyor, along line 2—2 of Fig. 1.

Fig. 1 shows diagrammatically a side view of a chocolate depositor and conveyor embodying my invention. The depositing machine is essentially of the kind heretofore used, but is provided with a plurality of sets of depositing nozzles.

A heated tank, or reservoir, 1 of the usual water or steam-jacketed type is provided with agitating blades 2, to keep the molten chocolate of uniform consistency. The bottom of the reservoir 1 is formed to present four trough-like compartments, in each of which is a pair of oppositely-rotating feed rolls 3, of known kind. Each pair of rolls 3 rotates inward and downward toward each other to force chocolate under pressure through depositing nozzles A, B, C, D. The depositing nozzles are provided with oscillatory valves 4 of known kind, shown here in their open position.

Valves 4 are each provided with an actuating lever arm 5, which at their outer ends are pivoted to a common connecting rod 6.

A bell-crank 5—7 operatively connects rod 6 through a connecting rod 8 to a crank 9 fixed to a drive-shaft 10. Rotation of shaft 10 imparts simultaneous oscillatory motion to the mechanism of valves 4.

Shaft 10 is operatively connected to, or driven synchronously with the drive mechanism for the mold conveyor 11, in known manner. For example, Fig. 1 shows diagrammatically a sprocket 19 fixed to shaft 10 and driven by chain 20, which also passes over a sprocket 23 fixed to the shaft 24 which drives the conveyor sprockets 25. Conveyor 11 travels to the right in Fig. 1, entering and passing through a cooling plant (not shown) of the kind shown in United States Patent No. 1,871,346, issued August 9, 1932, to R. Savy.

Referring to Fig. 2, it is seen that in accordance with previous practice a row of feed rolls 3 on a common shaft extend transversely of the reservoir, separated by division plates 3a each pair of rolls 3 feeding a separate nozzle A. All of the nozzles in each row simultaneously deposit identical quantities of molten chocolate.

As described so far, the chocolate depositor shown differs from those previously used in having a plurality of sets of feeding rolls, nozzles, and valves arranged lengthwise of the conveyor 11, each set of which operates in the manner of a single machine of the kind described. The common drive means described for actuating the valves of nozzles A, B, C, D insures their simultaneous functioning.

The novel arrangement by which the purpose of the invention is accomplished, namely, to increase the rate of output of a given mold-filling plant, lies in the relation of these simultaneously operable sets of depositing nozzles to the trays or molds into which chocolate is deposited.

Referring to Fig. 1, the spacing or pitch between the sets of depositing nozzles A, B, C, D bears a definite relationship to the spacing of the mold trays on the conveyor.

For purposes of illustration, I show four groups or trays of molds 12, 13, 14, 15. These trays are identical, consisting each of ranks a, b, c, d of individual molds 16. Each of the trays shown contains forty molds 16, arranged in four ranks of ten molds each. The spacing of successive trays 12, 13, 14, 15 is determined by lugs 17 carried by the conveyor.

As in the depositors heretofore employed, a suitable ratio between the speed of drive mechanism (not shown) of conveyor 11, and that of drive shaft 10 of the valve-actuating mechanism is selected so that nozzles A, B, C, and D are opened to discharge chocolate each time the conveyor travels in a given distance beneath them. In the previous machines having a single row of depositing nozzles the frequency of depositing was determined so that a deposit was made each time a rank of molds a, b, c, d in tray 12 passed beneath it. Since molten chocolate is relatively viscous, and since therefore a definite limit is placed upon the frequency of operation of the nozzle valves, the number of molds which would be filled per unit of time was definitely limited. A further mechanical limitation arises from the fact that depositing machines of this kind are usually mounted on wheels 18 and given an oscillatory back-and-forth travel with each deposit, so that the nozzles move with or follow up the traveling molds while they are being filled. The great inertia of the heavy apparatus precludes extremely rapid reversal of its travel. Therefore, only by a duplication of the depositing and cooling plant could the output in pieces per unit be doubled.

In the present machine the valves 4 of nozzles A, B, C, and D are driven in timed relationship to the travel of the conveyor, opening each time the conveyor travels a distance equal to the pitch distance between successive trays. The spacing of nozzles A, B, C, D lengthwise of the conveyor 11 in terms of the pitch of the mold trays, that is, the distance between ranks a of trays 13 and 14, is equal to that pitch distance less the length of one rank a, b, c, or d of molds 16.

In operation this arrangement makes possible the following action:

With the conveyor 11 moving to the right in Fig. 1 at a constant speed, and with the valve nozzles A, B, C, and D operating in timed relationship to the conveyor speed, nozzles A deposit in rank a of molds in tray 12; nozzles B deposit in rank b of molds in tray 13; nozzles C deposit in rank c of molds in tray 14; and nozzles D deposit in rank d of molds in tray 15.

As the molds pass from beneath the nozzles from which they have been filled, the valves are closed by the action of driveshaft 10, and stay closed until tray 12 has moved one pitch distance into the position of tray 13. Mold ranks b, c, d of trays 12, 13, 14 are then filled simultaneously at the next opening of the depositing nozzles B, C, D, and the leading rank of molds in the tray following tray 12 is filled by nozzles A. A single tray, for example, tray 12 has its molds in rank a filled by nozzles A; rank b by nozzles B; rank c by nozzles C; and rank d by nozzles D, so that when it passes from under the depositing machine all of its molds 16 have been filled.

It can be seen that the machine illustrated multiplies by four the rate of output of the earlier machines at a given frequency of deposit. The constant speed of the conveyor will be increased proportionately to the increase in output, if the size of the molds is not changed, or it will be virtually unchanged if the increase in rate of deposit is utilized in depositing lesser amounts, for example, smaller candy bars.

While I have shown and described a machine employing four sets of depositing nozzles lengthwise of the conveyor travel, the invention is not limited to this specific structure. Apparatus embodying my novel principle can be built with a less or a greater number of sets of nozzles or valves for multiplying proportionately the output of a single set of depositing nozzles. Similarly it is applicable to a plant having a plurality of single nozzles along a conveyor for filling molds or other containers in single file. The invention is not limited to the apparatus disclosed, but can be employed for filling cartons, jars, or other containers with fluent or plastic products of many kinds.

A further feature of my invention is its adaptability to depositing of large candy bars in long molds.

In the manufacturing of chocolate bars of large size difficulty is encountered in obtaining accurate measure and rapid production because of the inability of the depositing nozzles and valves to check the voluminous flow of chocolate cleanly. When depositing large volumes of chocolate rapidly there is a tendency for the nozzles to drip substantial quantities after the flow of chocolate has been shut off. With smaller nozzles this does not occur, so that smaller deposits may be accurately measured.

My machine may be used without modification, to fill molds of large size. Referring for purposes of illustration to the mold trays 12, 13, 14, and 15, single molds of the length of these trays may be substituted, so that in effect the individual molds are merged into single units four times as large. The filling of these larger molds then takes place in four steps, each nozzle filling one-fourth of the mold. After the molds have been carried past the last nozzle the four accurately measured deposits of chocolate flow together to form a single bar.

The appended claims therefore are to be understood as including the invention operated in this way, taking the term "group of molds" as embracing a plurality of depositing stations or zones within a single tray, whether or not such zones are separated by partitions as shown in the drawing.

Having thus described my invention, what I claim and desire to secure by Letters Patent is:

1. In apparatus for depositing fluent material in molds or other containers, in combination, a continuously traveling conveyor for carrying said molds in file past said depositing apparatus, a plurality of depositing nozzles spaced along said conveyor at intervals equal to the pitch distance on said conveyor between successive groups of molds comprising each as many molds as there are nozzles minus the length of one mold, and actuating means for said nozzles operable in timed relation to the travel of said conveyor to cause said nozzles to deposit material simultaneously each time said conveyor advances one pitch distance between said mold groups.

2. In apparatus for depositing measured quantities of fluent material in containers, in combination, a conveyor for carrying said containers in file, a plurality of depositors spaced along said conveyor and operable to deposit simultaneously each in one of said containers, said depositors being spaced so that each depositor fills one container only of a group of containers taken along the conveyor, said groups comprising each a number of containers equal to the number of said depositors, the first of said depositors filling the first container of each group, the second depositor filling the second container, etc., and means for actuating said depositors in timed relation to the travel of said conveyor.

MAX MARC GUGGENHEIM.